Figure 1:
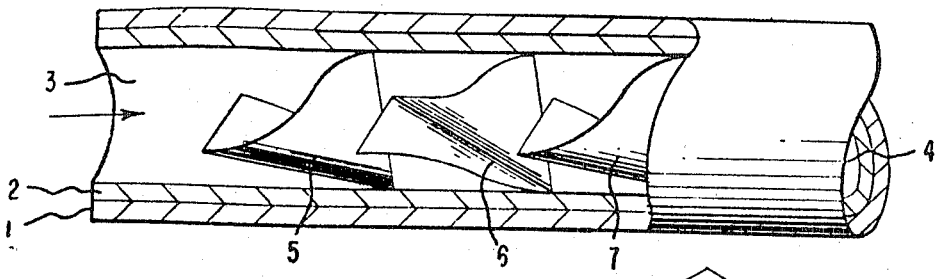
Figure 2:
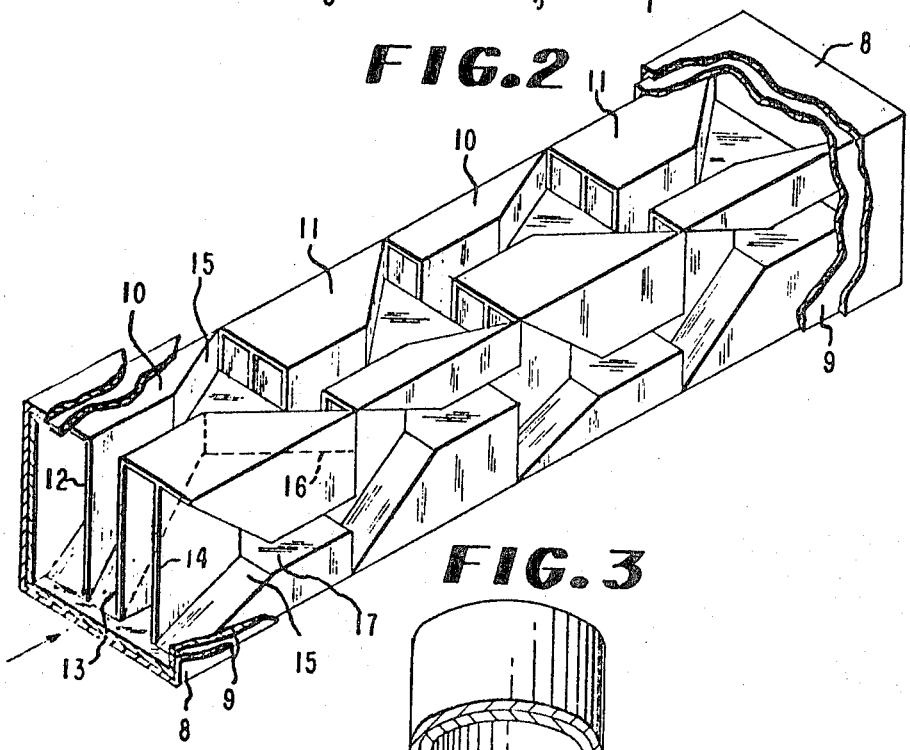
Figure 3:
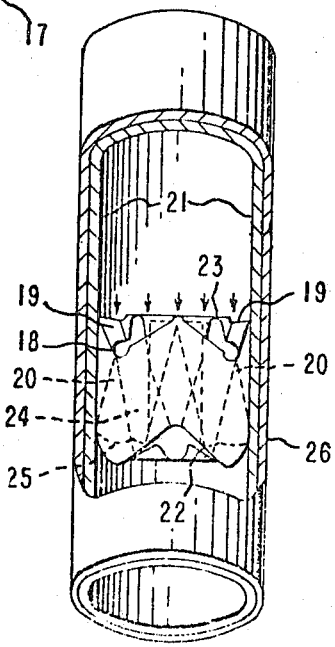

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 10, 1973

912 O.G. 402

T912,007

FLOW DIVIDERS IN MEMBRANE PERMEATION SEPARATION APPARATUS

Naftali Walter Rosenblatt, Wilmington, Del., assignor to E. I. du Pont de Nemmours and Company, Wilmington, Del.

Continuation-in-part of abandoned application Ser. No. 89,225, Nov. 13, 1970. This application Oct. 3, 1972, Ser. No. 294,586

Int. Cl. B01d *13/00*

U.S. Cl. 210—23

1 Sheet Drawing. 22 Pages Specification

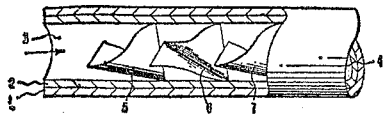

Concentration polarization and the resulting decreased efficiency of selective permeation separation processes using membranes is reduced by devices located near the membranes which repetitively divide the flowing feed mixture stream into substreams, displace these sub-streams with respect to each other and the membrane, and contact at least one displaced substream with the membrane.

July 10, 1973 N. W. ROSENBLATT T912,007

FLOW DIVIDERS IN MEMBRANE PERMEATION SEPARATION APPARATUS

Filed Oct. 3, 1972